United States Patent
Venkatraman et al.

(10) Patent No.: US 9,883,431 B2
(45) Date of Patent: Jan. 30, 2018

(54) HIGH SPEED HANDOVERS IN A WIRELESS NETWORK

(75) Inventors: Shankarakrishnan Venkatraman, Irvine, CA (US); Khurram Parviz Sheikh, San Clemente, CA (US); Rajeev Vokkarne, Plano, TX (US)

(73) Assignee: INTEL CORPORATION, Santa Clara, CA (US)

( * ) Notice: Subject to any disclaimer, the term of this patent is extended or adjusted under 35 U.S.C. 154(b) by 32 days.

(21) Appl. No.: 13/556,131

(22) Filed: Jul. 23, 2012

(65) Prior Publication Data

US 2013/0095839 A1    Apr. 18, 2013

Related U.S. Application Data

(60) Provisional application No. 61/510,968, filed on Jul. 22, 2011, provisional application No. 61/649,152, filed on May 18, 2012.

(51) Int. Cl.
*H04W 36/04* (2009.01)
*H04W 36/32* (2009.01)

(52) U.S. Cl.
CPC ............ *H04W 36/04* (2013.01); *H04W 36/32* (2013.01)

(58) Field of Classification Search
CPC . H04W 24/10; H04W 36/30; H04W 36/0083; H04W 36/04; H04W 16/32; H04W 36/08; H04W 52/244; H04W 36/32; H04W 92/20; H04W 36/0005; H04W 36/0094; H04W 36/00; H04W 36/0016; H04W 36/0022; H04W 36/0061; H04W 72/0426
(Continued)

(56) References Cited

U.S. PATENT DOCUMENTS

2001/0044306 A1* 11/2001 Shimono et al. ............. 455/441
2002/0102976 A1*  8/2002 Newbury et al. ............ 455/436
(Continued)

FOREIGN PATENT DOCUMENTS

CN          101227705          7/2008
CN          101480084          7/2009
(Continued)

OTHER PUBLICATIONS

Huawei, Inter-Cell Interference Mitigation, 3GPP Draft; R1-050629, 3rd Generation Partnership Project, Mobile Competence Centre, Jun. 16, 2005.
(Continued)

*Primary Examiner* — Dinh P Nguyen
(74) *Attorney, Agent, or Firm* — Eversheds Sutherland (US) LLP

(57) ABSTRACT

In one aspect, a wireless network management component can manage values for the generation of time to trigger parameters to handover requests between small cells and macro cells in a wireless network. In another aspect, a wireless management component can process various information to manage when handovers between small cells and macro cells should be disabled. In still another aspect, a wireless management component can process user equipment speed information and other network information to determine whether user equipment in communication with small cells should initiate a handover to macro cells.

29 Claims, 7 Drawing Sheets

(58) Field of Classification Search
USPC ........ 370/252, 331, 328, 253; 455/436, 444, 455/422.1, 424, 442
See application file for complete search history.

(56) References Cited

U.S. PATENT DOCUMENTS

| | | | |
|---|---|---|---|
| 2002/0132628 A1* | 9/2002 | Matsumoto | H04W 36/32 455/456.1 |
| 2003/0114159 A1* | 6/2003 | Park et al. | 455/436 |
| 2003/0119508 A1* | 6/2003 | Gwon et al. | 455/436 |
| 2004/0121777 A1* | 6/2004 | Schwarz | H04W 36/22 455/452.1 |
| 2005/0221828 A1* | 10/2005 | Wakuta | H04W 36/30 455/437 |
| 2005/0250509 A1* | 11/2005 | Choksi | 455/452.1 |
| 2009/0092080 A1* | 4/2009 | Balasubramanian | H04J 11/0093 370/328 |
| 2009/0201867 A1 | 8/2009 | Teo | |
| 2009/0275334 A1 | 11/2009 | Xie et al. | |
| 2011/0039564 A1* | 2/2011 | Johnstone | H04W 36/22 455/436 |
| 2012/0083262 A1* | 4/2012 | Dimou et al. | 455/423 |
| 2012/0252463 A1* | 10/2012 | Zou | G01S 5/021 455/441 |

FOREIGN PATENT DOCUMENTS

| | | | | |
|---|---|---|---|---|
| CN | 101772099 | | 7/2010 | |
| EP | 2034750 | A1 | 3/2009 | |
| EP | 2211584 | A2 | 7/2010 | |
| GB | 2301733 | A * | 12/1996 | ............... H04Q 7/38 |
| JP | 11-252613 | | 9/1999 | |
| WO | 2010080849 | A2 | 7/2010 | |
| WO | 2011136565 | A2 | 11/2011 | |

OTHER PUBLICATIONS

Sharp, Uplink Inter-cell Interference Management for LTE, 3GPP Draft; R1-072714, 3rd Generation Partnership Project, Mobile Competence Centre, Jun. 20, 2007.
Texas Instruments, Signaling Requirements to Support Semi-Static Frequency Planning for Inter-Cell Interference Mitigation in EUTRA Downlink, 3GPP Draft; R1-060369, 3rd Generation Partnership Project, Mobile Competence Centre, Feb. 9, 2006.
Office Action for Japanese Application No. 2014-522932 mailed May 10, 2016 (12 pgs., 7 pgs. of translation).
Second Office Action for Japanese Application No. JP 2014-522932, mailed Nov. 15, 2016, 24 pages (13 pages English translation).
Office Action for Japanese Application No. 2014/522932, dated Jun. 6, 2017, 10 pages (2 pages English translation).
First Office Action for Chinese Application No. 201280046120.4, dated Mar. 29, 2017, 21 pages (11 pages English ranslation).
Second Office Action for Chinese Application No. 201280046120.4, dated Aug. 29, 2017, 10 pages (3 pages English translation).

* cited by examiner

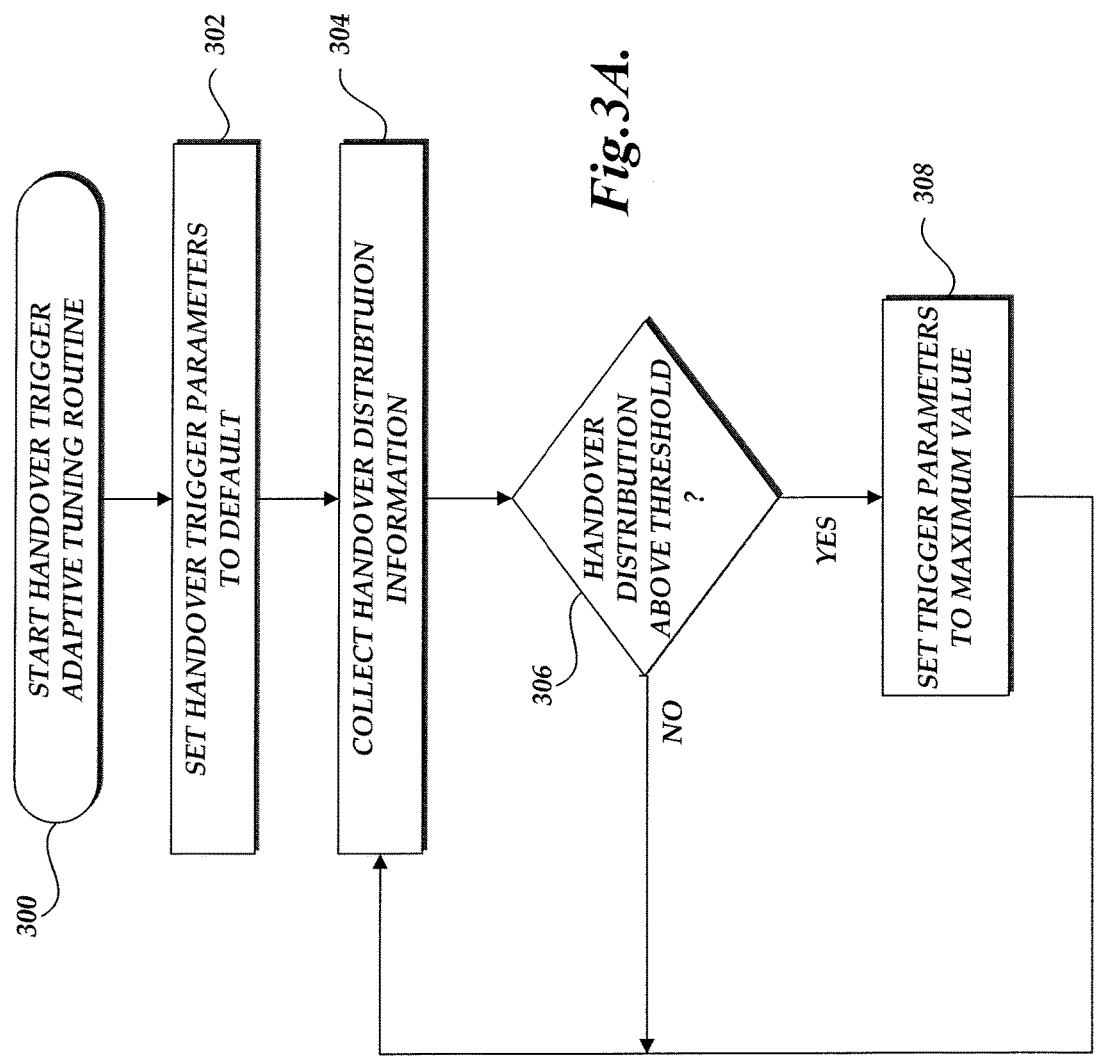

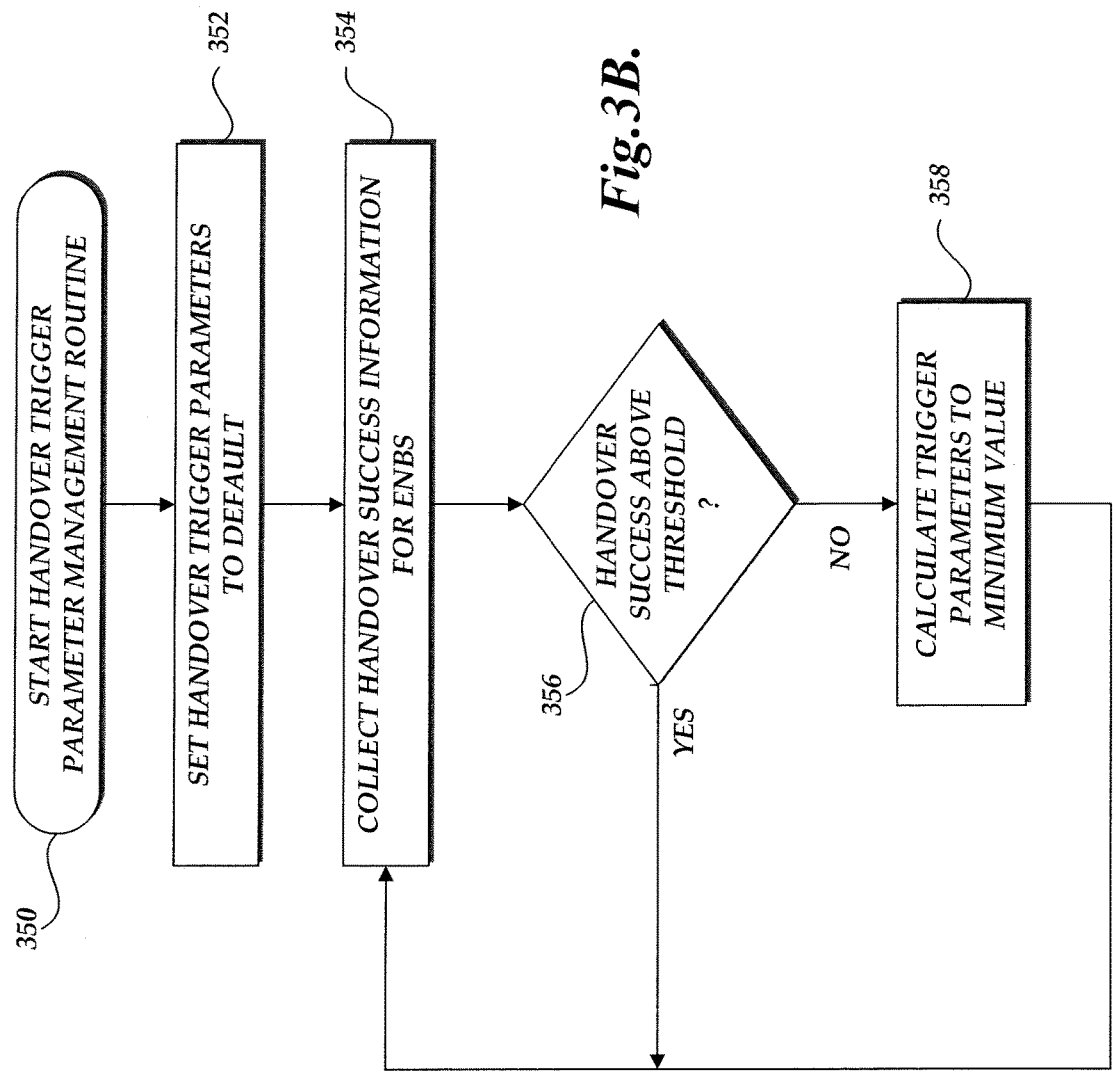

HIGH SPEED HANDOVERS IN A WIRELESS NETWORK

CROSS-REFERENCE TO RELATED APPLICATIONS

This application claims the benefit of U.S. Provisional Patent Application No. 61/510,968, entitled "PICO CELL" and filed Jul. 22, 2011. This application also claims the benefit of U.S. Provisional Patent Application No. 61/649,152, entitled "INTELLIGENT HANDOVER" and filed on May 18, 2012. U.S. Provisional Patent Application No. 61/510,968 and U.S. Provisional Patent Application No. 61/649,152 are incorporated by reference herein.

BACKGROUND

Wireless networks are networks that use radio waves to carry information from one node in the network to one or more other nodes in the network. Wired communication can also be used in portions of a wireless network, such as between cells or access points. Wireless networks are used in connection with many applications, including, for example, satellite communications systems, portable digital assistants (PDAs), laptop computers, and mobile devices (including cellular telephones and user equipment). Users of such applications can connect to a network as long as the user is within range of such a wireless communication technology. The range of the wireless communication technology can vary depending on the deployment.

Cellular wireless networks are characterized by the use of base stations that provide radio coverage for a geographic area, with multiple base stations arranged to provide contiguous radio coverage over a larger area. Generally, when a mobile station is positioned within a coverage area of a base station, the mobile station can communicate in accordance with an air interface communication protocol with the base station. In turn, the base station can provide voice and data access to the mobile station via one or more circuit-switched, packet-switched signaling or transport networks.

The geographic coverage area of a base station is sometimes defined in terms of a geometric shape of a cell and base stations can often be referred to as "cells." Generally, the coverage area associated with a given cell may be logically divided geographically into a number of sectors, with each sector being defined respectively by radiation patterns from directional antenna components or antennas of the respective base station. Base stations are typically not associated with any subscriber or small group of subscribers in particular. Rather, a service provider will attempt to location base stations in publicly-accessible locations for use by the service provider's customers generally.

Traditional base stations include macro cell transceivers that are typically configured to provide wireless communications for users having properly configured mobile devices over several kilometers. The wireless communications correspond to one or more wireless communication air interface standards, such as second, third or fourth generation air interface standards. To address gaps in a macro network coverage and for other reasons such as for relief from capacity constraints, macro network service providers have recently shown interest in lighter infrastructure referred to as small cells, which may also be referred to as pico cells, small base stations, small BTSs, and by other names. Typical small cell base stations can include transceivers that provide wireless communications for the properly configured mobile devices within several hundreds of meters of a particular small cell. Illustratively, the small cells are configured to operate in accordance with the same wireless communication air interface standards. The combination of macro and small cells by a service provider can be considered a heterogeneous network, in which the service provider may attempt traffic offloading from macro base stations to small cell base stations.

BRIEF DESCRIPTION OF THE DRAWINGS

FIG. 3A a flow diagram illustrative of handover trigger adaptive tuning routine implemented in a wireless network;

FIG. 3B is a flow diagram illustrative of a handover trigger parameter management routine implemented in a wireless network;

DETAILED DESCRIPTION

Generally described, the present disclosure relates to handover management in heterogeneous networks and specifically high speed macro cell and small cell handover scenarios. In an illustrative embodiment, a wireless network management component manages one or more parameters that control how often user equipment within a wireless network determine whether to implement handovers between cells. More specifically, the wireless network management component can manage values for the generation of time to trigger parameters ("TTT parameter") to handover requests between small cells and macro cells in a wireless network. In another aspect, a wireless management component can process various information to manage when handovers between small cells and macro cells should be disabled. In still another aspect, a wireless management component can process user equipment speed information and other network information to determine whether user equipment in communication with small cells should initiate a handover to macro cells.

Although one or more aspects of the present disclosure will be described with regard to illustrative embodiment or examples, one skilled in the relevant art will appreciate that each aspect of the present disclosure can be implemented separately or that various combination of aspects may be combined. Specifically, aspects of the present disclosure will be described with regard to heterogeneous wireless networks implementing orthogonal frequency division multiplexed ("OFDM") based air interface standards, such as LTE. One skilled in the relevant art will appreciate that the present disclosure is not necessarily limited to the illustrated heterogeneous wireless networks and can be applicable to alternative embodiments of heterogeneous wireless networks as well as various embodiments of homogeneous wireless networks. Still further, the present disclosure is not necessarily limited to implementation of any particular air interface, such as LTE. Accordingly, no particular combination of aspects of the present disclosure should be inferred.

Figure 1:
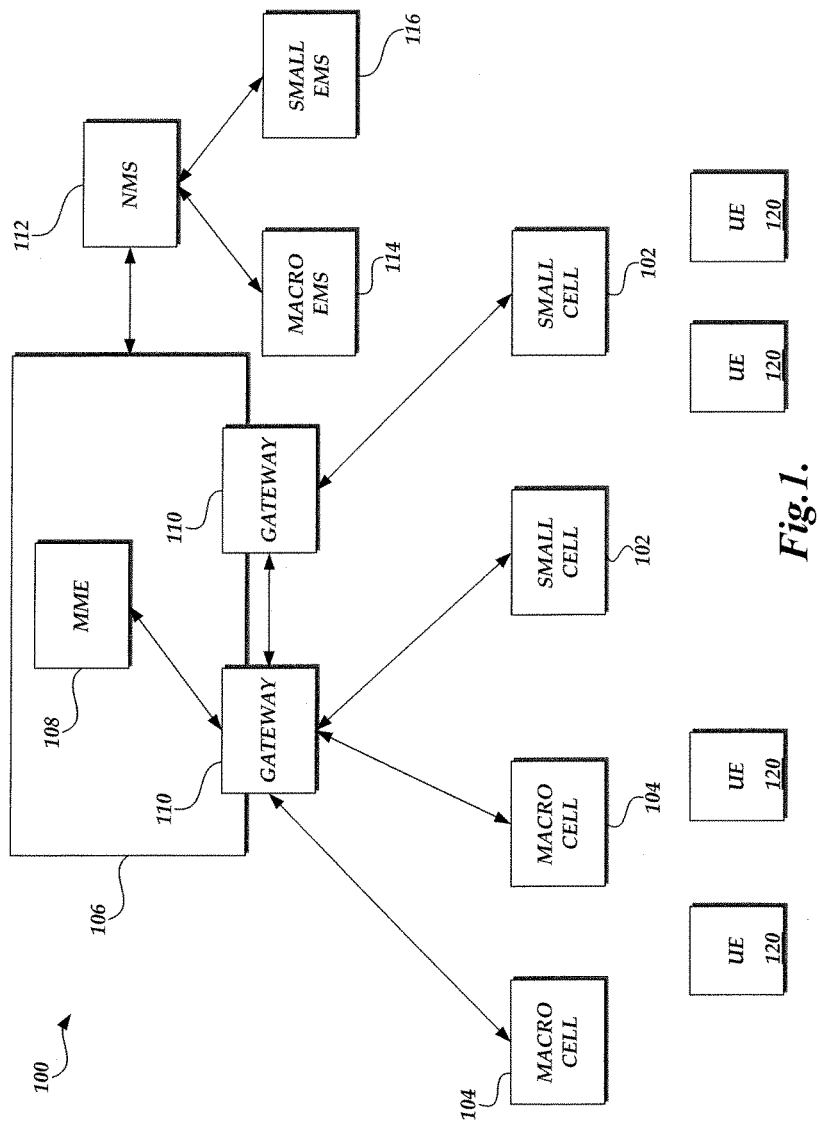
FIG. 1 is a block diagram of an embodiment of a heterogeneous network including a plurality of small cells and macro cells.

FIG. 1 is a block diagram of an embodiment of a heterogeneous network 100 including a plurality of small cells 102 in combination with network of macro cells 104. In accordance with traditional wireless infrastructure configurations, the small cells 102 and the macro cells 104 would be in communication with core network components, generally represented at block 106. The core network components 106 can include one or more Mobility Management Entity (MME) 108 through one or more serving gateways 110. The communication interface between the small cells 102 and the serving gateway 110 may be over a network interface, such as a S1 interface. Alternatively, the communication between the small cells 102 and the serving gateway 110 can be achieved via a public network, such as via S1 interface utilizing a tunneling protocol. In various embodiments, a common network management system (NMS) 114 (also referred to as network management device (NMD)) may be configured to oversee and unify the respective element management systems (EMS) for the macro network (EMS 114) and the small network (EMS 116). As will be explained in greater detail, the NMS 112 can function to implement one or more algorithms for allocating and configuring bandwidth.

In general, user equipment 120 may correspond to any computing device having one or more telecommunication components capable of communicating with the small cells 102 and macro cells 104 in accordance with wireless air interface standards. The user equipment 120 can illustratively include mobile phones, personal data assistants (PDAs), smart phones, tablet PCs, personal computing devices, appliances, and the like. Additionally, the telecommunication components capable of communicating with the small cell 102 and macro cells 104 can integrated directly into the user equipment or provided as an add-on component or supplemental component. Still further, the telecommunications components capable of communicating with the small cells 102 and macro cells 104 may be shared by two or more user equipment. For example, two or more user equipment may share communication components utilizing wired connections, often referred to as tethering, or via a wireless communication protocol, often referred to as a hotspot.

In general, user equipment 120 may communicate with a number of macro cells 104 or small cells 102. In some instances, user equipment 120 may sequentially communicate between two macro cells 104. In other instances, user equipment 120 may sequentially communicate between a macro cell 104 and a small cell 102, or vice versa. In still further instances, user equipment 120 may sequentially communicate between two small cells 102. Generally, a handover between, or an offload from, a first cell (e.g., a macro cell 104 or small cell 102) and a second cell in which communications between the user equipment and service provider correspond to the same air interface standard may be referred to as a horizontal handover or offload.

Figure 2:
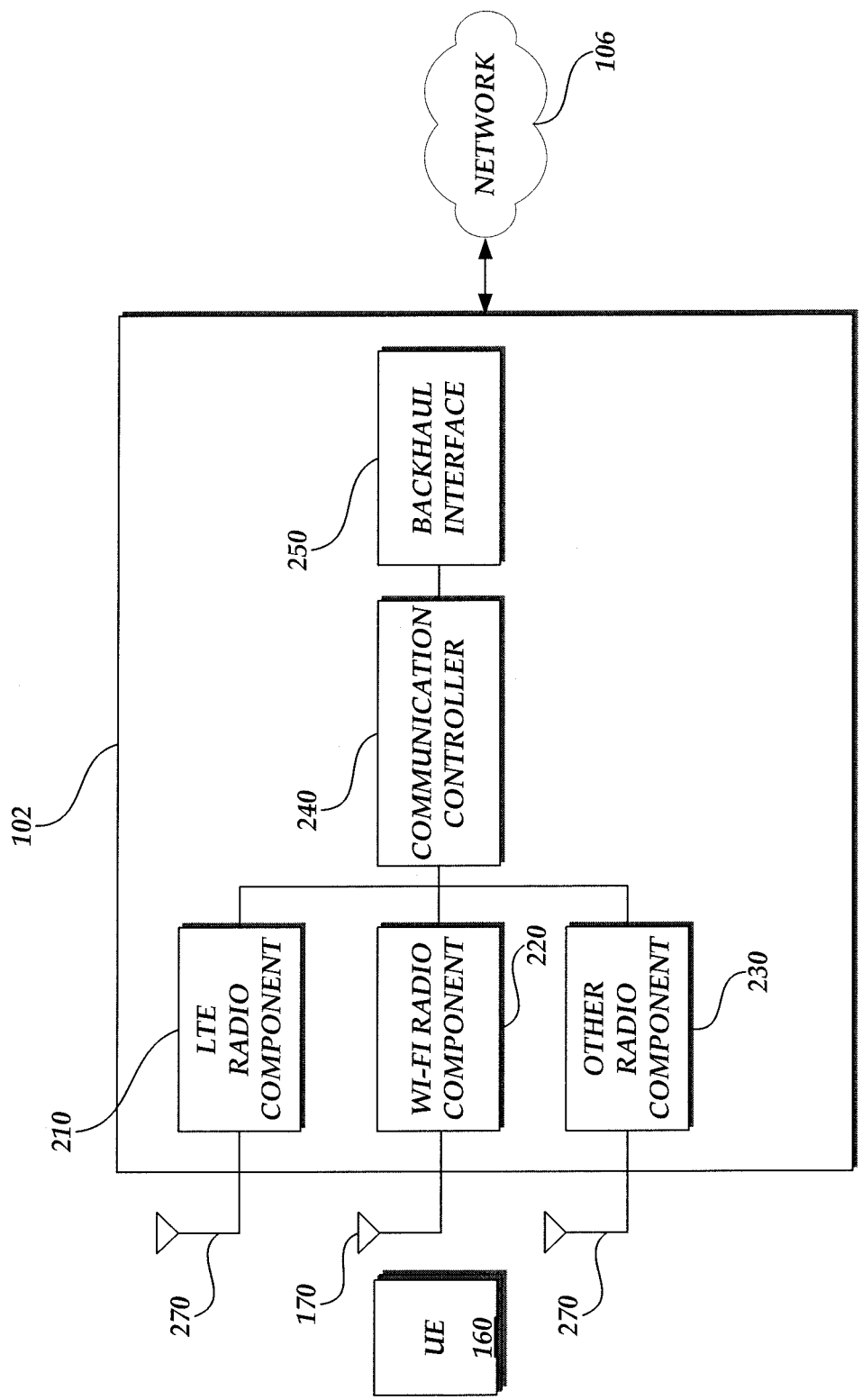
FIG. 2 is a block diagram of illustrative components of an embodiment of a small cell for implementation in a heterogeneous network of FIG. 1.

FIG. 2 is a block diagram of illustrative components of an embodiment of a small cell 102 (FIG. 1) for implementation in a heterogeneous network 100. FIG. 2 illustrates an embodiment where two illustrative air interface standards, a longer range wireless air interface standard (e.g., the Long Term Evolution ("LTE") fourth generation air interface standard and a shorter ranger wireless air interface standard (e.g., the Wi-Fi air interface standard) are supported with the same device. Although FIG. 2 is described with regard to a small cell 102, one skilled in the relevant art will appreciate that other cells in a heterogeneous networks, such as macro cells 104, would have similar functionality or components.

Illustratively, the small cell 102 includes an integration of a set of components that facilitate transmission of data in accordance with the supported wireless air interface standards, including, but not limited to, antennas, filters, radios, base station control components, network interface components and power supplies. One skilled in the relevant art will appreciate that all such components that could be implemented in a small cell 102 are not illustrated for purposes of brevity and not limitation. Illustratively, the small cell 102 can include second components for receiving signals transmitted in accordance with one or more supported air interface standards.

As illustrated in FIG. 2, one embodiment of a small cell 102 can be configured to facilitate communication in accordance with at least two air interface standards. In one embodiment, the first radio component can corresponds to an LTE radio 210 and the second radio component can corresponds to a Wi-Fi radio 220. The two radio components can be configured into a form factor that facilitates incorporation into the form factor desired for the small cell 102. In other embodiments, the radios may be configured to support other technologies, or more or less radios may be present in the small cell. As also illustrated in FIG. 2, the small cell 102 can also include an additional radio component 230 for receiving signals in accordance with a third interface standard. The additional radio component 230 can be configured to receive signals in a manner redundant to either the first or second radio components 210, 220 or in a manner additional to the first and second radio components In various embodiments, the LTE radio component 110 may support frequencies from 700 MHz to 2600 MHz in frequency division duplex (FDD) and/or time division duplex (TDD) modes. In FDD embodiments, the LTE radio component 210 may provide a single RF carrier with support of up to 20 MHz FDD channels. Illustratively, the LTE air interface standard can be considered a longer range air interface standard based on the likely geographic range of communications between devices communicating in accordance with the LTE air interface standard. In some embodiments, the Wi-Fi radio component 220 may support several frequency bands simultaneously using multiple radios. For example, the Wi-Fi radio component 220 may support communications in the 2.4 GHz and 5 GHz frequency range. Illustratively, the Wi-Fi radio 220 may be configured to have up to 40 MHz channels. Illustratively, the Wi-Fi air interface standard can be considered a shorter range air interface standard based on the likely geographic range of communications between devices communicating in accordance with the Wi-Fi air interface standard. However, the characterization of air interfaces as longer range or shorter range does not necessarily imply the definition of any specific geographic ranges. Rather, any interface standard may be considered a longer range or shorter range air interface standard relative to another air interface standard.

As illustrated in FIG. 2, the LTE radio component 210 and the Wi-Fi radio component 220 are connected to a base station controller 240. The communication controller 240 includes common control software and provides operation and maintenance support for all technologies supported by the small cell 102. The communication controller 240 can include the same or variations similar controllers included in other infrastructure equipment, such as macro cells. The communication controller 240 is also connected to a backhaul interface 250 in the small cell 102. In various embodiments, the small cell 102 leverages a Small Form factor Pluggable (SFP) module as the backhaul interface 250. This allows flexibility to backhaul traffic with fiber, PicoEthernet or a large variety of wireless backhaul products. As indicated in FIG. 2, the small cell 102 interfaces with various user equipment (user equipment) 120 through antennas 270, and also with a core network 106.

In the architecture, the radio components 210, 220 in the small cell 102 communicate with the carrier's core network 180 using industry standard communication protocols. For example, the LTE radio component 110 can transmit information in accordance with the transfer control protocol ("TCP") and Internet Protocol ("IP") protocols.

A. Management of Handover Trigger Parameters

As previously described, one aspect of the present disclosure relates to the management of a handover trigger parameter, such as a time to trigger parameter. Generally described, previous attempts for management of handover trigger parameters enabled speed dependent handover parameters. In this approach, user equipment adjusts a handover trigger parameter by a scaling factor which is a function of an assessment of user equipment mobility. Illustratively, each user equipment determines its mobility state based on the number of cell reselections within a certain period of time. Additionally, the user equipment mobility status may be characterized as one of a set of categories, such as Normal, Medium or High Mobility. Sf-Medium or Sf-High are then applied as scaling to handover trigger parameter to trigger a handover request faster in case of user equipment associated with higher speed. This technique reduces the hysteresis period prior to a handover trigger and enables a user equipment to hand over to the new cell faster. However, it does not provide any mechanism of minimizing or separating high speed handover traffic based on cell size.

Generally described, in accordance with one or more air interface standards, such as LTE, handovers can be initiated by user equipment 120 based on measurement parameters configured by the network. Parameters are signaled using Radio Response Control (RRC) control messages by the serving eNB indicating cell specific thresholds. Illustratively, in accordance with an embodiment, a handover parameter, such as the time to trigger ("TTT") parameter is associated with IE ReportConfigEUTRA (Reporting Configuration), and a different report can be associated with each carrier frequency (or Measurement Object). This ability can be used to then associate a different TTT for an underlay small cell network at a different band. Increasing the TTT can be useful in delaying the trigger for a handover, which in turn can help reduce the number of handover attempts from fast moving users, while not impacting pedestrian users. In one embodiment, since TTT is broadcast by a serving cell or eNB, in the case of macro cell 104 to small cell 102 handovers, optimal value of TTT used for user equipment 120 entering the small cells may be broadcast by the macro cell.

As previously, in one aspect of the present disclosure, management of handover trigger parameters, such as TTT, will be described. More specifically, in one embodiment, management of the handover trigger parameter by adaptive tuning will be described. In another embodiment, management of the handover trigger parameters by limiting a maximum handover trigger parameter will be described. Illustratively, management handover trigger parameter may be broadcast by a source cell, and applied to all neighbors for all user equipment 120 in adjacent cells. For user equipment associated with higher velocity, the delay in the handover parameter may mitigate handover requests to small cells 102 from macro cells 104.

Turning now to FIG. 3A, a flow diagram illustrative of handover trigger adaptive tuning routine 300 implemented in a wireless network 100 will be described. In this embodiment, routine 300 may be implemented to increase the handover trigger parameter and delay the number of handover attempts by user equipment. More specifically, increasing the handover trigger parameters can be associated with user equipment classified as "high speed" user equipment to prevent handovers to small cells from macro cells. With reference to FIG. 3A, routine 300 begins at block 302 with the initial setting of the handover trigger parameter to a default value. Illustratively, the default value of the handover trigger parameter may correspond to a handover trigger parameter that is acceptable for all user equipment.

At block 304, a management component collects handover distribution information. Illustratively, the handover distribution information can correspond to a determination of an average amount of time in between handover attempts by user equipment or the frequency of handover requests transmitted by user equipment. At decision block 306, a test is conducted to determine whether the handover distribution information is above a handover frequency/handover distribution threshold. If the handover distribution information is not above the threshold, the handover trigger parameter is not modified and the routine 300 returns to block 304. Alternatively, if at decision block 306, the handover distribution information is above the handover frequency/handover distribution threshold, it can be assumed that the handover trigger parameter may be increased to delay the number of handover attempts transmitted by the user equipment. Accordingly, at block 308, the handover trigger parameter is set to an incremental value. Illustratively, the incremental value may correspond to a default maximum value for the handover trigger parameter or an incremental valued based on a previous value for the handover trigger parameter. The routine 300 then returns to block 304.

Turning now to FIG. 3B, a flow diagram illustrative of handover trigger management routine implemented in a wireless network 100 will be described. In this embodiment, routine 350 may be implemented in conjunction with routine 300 (FIG. 3A) to determine a maximum handover trigger parameter value based on failure rate information. Illustratively, a management component may wish to modify the handover trigger parameter in the event that failure rates based on a current handover trigger parameter exceed a threshold. With reference to FIG. 3B, routine 350 begins at block 352 with the initial setting of the handover trigger maximum parameter to a default value. Illustratively, the default value of the handover trigger parameter may correspond to a handover trigger parameter that is acceptable for all user equipment.

At block 354, the management component collects handover failure or success information, generally referred to as handover success rate. Illustratively, the handover success rate can correspond to a collection of successful handovers between at least a subset of the cells in the wireless network or a collection of the failure rate for handovers. At decision block 356, a test is conducted to determine whether the handover success rate is above a handover success threshold. If the handover distribution information is not above the threshold, the maximum handover trigger parameter is not modified and the routine 350 returns to block 354. Alternatively, if at decision block 356, the handover success rate is not above the handover success threshold, it can be assumed that the handover trigger parameter may need to be decreased because the current in delay the number of handover attempts transmitted by the user equipment is resulting in too many connection failures. Accordingly, at block 358, the maximum handover trigger parameter is set to a minimum value. Illustratively, the minimum value may correspond to a default minimum value for the maximum handover trigger parameter or a decremental valued based on a previous value for the maximum handover trigger parameter. The routine 350 then returns to block 354.

B. Management of Handover Requests

As previously described, in another one aspect of the present disclosure relates to the processing of handover requests at cells, such as small cells, to manage when handovers between small cells and macro cells should be disabled or mitigated. Illustratively, each small cell 102 can measure existing macro cell 106 coverage in the area of coverage of the small cell by sounding user equipment connected to the small cell. In one embodiment, the coverage area may be determined by periodically requesting for reference signal received power ("RSRP") or reference signal receiving quality ("RSRQ") information for adjacent cells. The RSRP and RSRQ information may be measured from reference signals transmitted by the cells to connected user equipment 120. In one embodiment, small cells 102 can enable high speed handover blocking if the coverage area associated with a macro cell is determined to be sufficient for the user equipment to maintain connectivity when traversing the small cell 102. In another embodiment, network level statistics relating to handover performance like radio link failure rates, handover failure rates and connection re-establishment rates can be monitored when high speed handover blocking is enabled to ensure that the admission control strategy does not lead to detrimental network performance.

Illustratively, the management of the handover requests includes a determination of user equipment speed. A classification of user equipment mobility state can be derived from the user equipment history information that may be available as part of the handover set up process. The source eNB can include the user equipment history in Source to Target Transparent Container IE in the HANDOVER REQUIRED message. Illustratively, the user equipment speed information can be made available to the eNB via Layer 3 signaling or as part of the handover Request, it could be utilized by the Source eNB in intelligently proceeding with Handovers to the correct layer (small cell or macro cell) based on user equipment speed in addition to user equipment RSRP reports.

In one embodiment, user equipment can be classified to be a higher speed user equipment based on comparing the average sojourn time metric derived from individual times user equipment stayed in particular cells with a threshold. This metric can also incorporate a metric to include the size of each of the previous cells. This information is available at least at a broad classification level based on identification on whether the eNB is a macro or a small.

$$R_{avg} = w_n(D_n/Ts_n) + w_{n-1}(D_{n-1}/Ts_n - 1) + \ldots$$

Here $R_{avg}$ represents the estimated speed of the user equipment $w_n$ the averaging co-efficient applied to the visited cell data Dn is an estimate of the distance of coverage for cell n Tsn represents the duration of stay in cell n User equipment speed information may also be obtained using previously obtained measurements on user equipment speed. This may be useful when an incoming handover from a macro cell 104 does not contain sufficient user equipment history information, but previous connectivity to a small cell 102 enabled speed estimation. In this case a central High Speed Block list can be maintained at a central EMS, such as NMS 112, containing user equipment identifies like S-TMSI or MME user equipment S1 AP Id which can help identify a user equipment (as being in a high state of mobility). Since user equipment mobility state could be transient, it should only apply to neighbors of a cell that identified the user equipment as high speed for a short duration of time. Having such functionality would allow for handover connections from a macro cells 104 to small cells 102 be denied based on recent speed estimates made on previous small cells. The speed estimate may only last for a pre-defined period of time after which it is no longer considered valid.

Figure 4A:
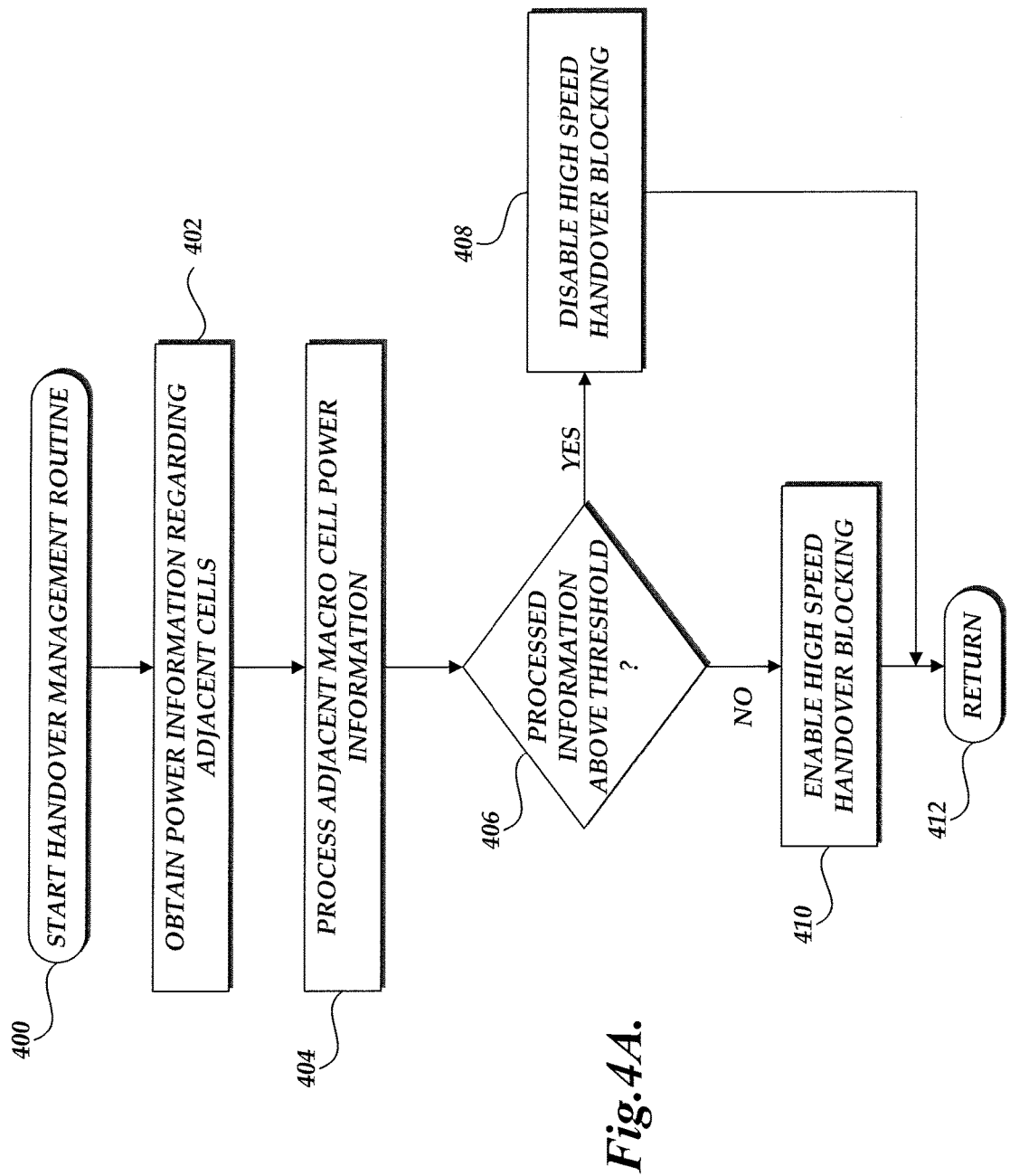
FIGS. 4A and 4B are flow diagrams illustrative of embodiments of handover management routine implemented in a wireless network.
Figure 4B:
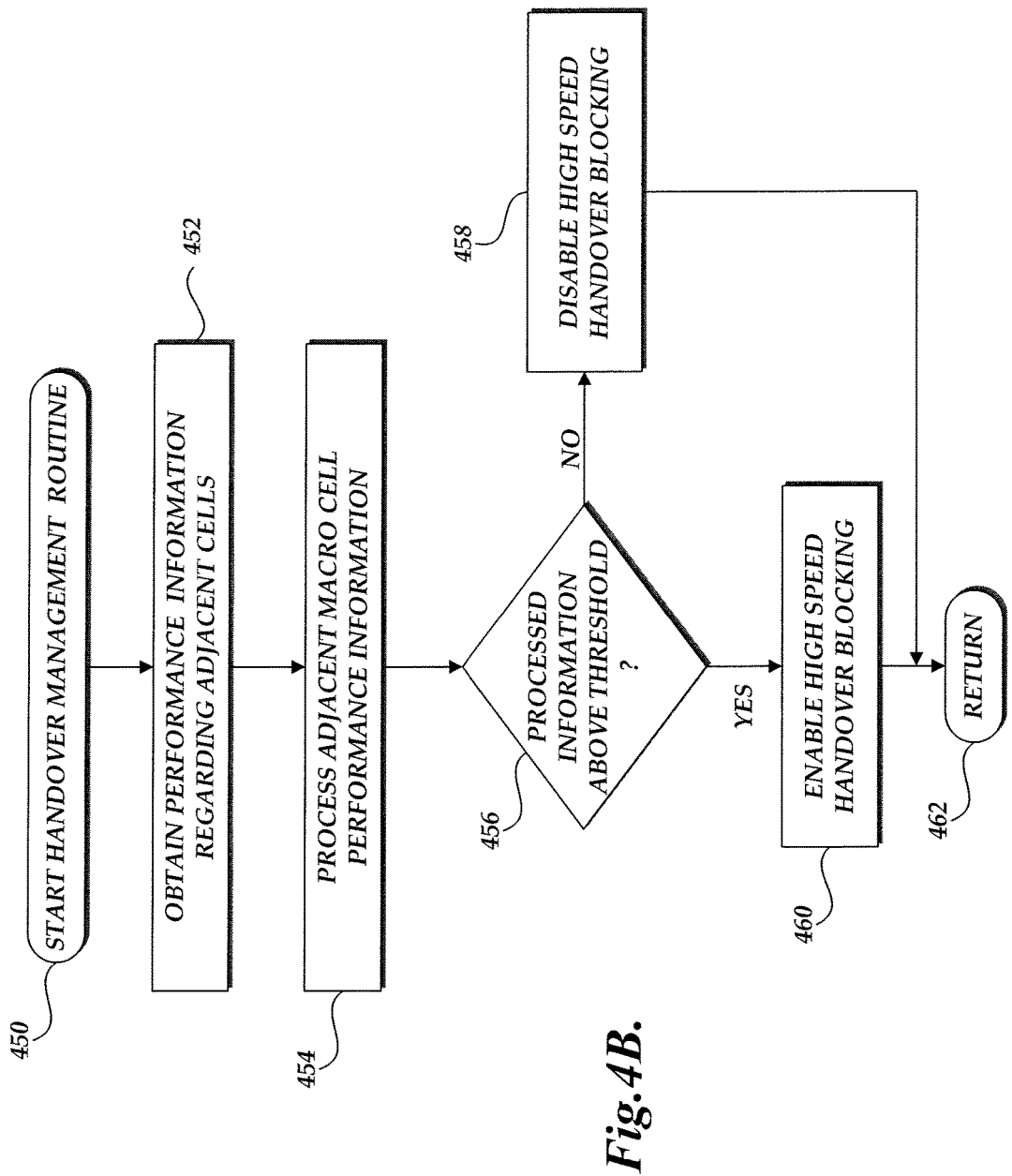

FIGS. 4A and 4B are flow diagrams illustrative of embodiments of handover management routine implemented in a wireless network. Illustratively, FIGS. 4A and 4B are implemented to determine a probability that macro cell 104 cover is available for high speed user equipment 120. With reference to FIG. 4A, at block 402, the management component obtains power information from one or more adjacent macro cells 104. Illustratively, the power information can correspond to RSQP reports, or the like, from user equipment 120 on a small cell 102. At block 404, the power information is processed to determine power information for a target macro cell.

At decision block 406, a test is conducted to determine whether processed power information is above a power threshold. If the processed power information is not above the power threshold, the probability of macro cell coverage for the high speed user equipment is not sufficient and the small cell 102 should attempt process handover requests by disabling high speed handover blocking at block 408. If the processed power information is above the power threshold, the probability of macro cell coverage for the high speed user equipment is sufficient and the small cell 102 should attempt process disable or delay handover requests by enabling high speed handover blocking at block 410. At block 412, the routine 400 terminates.

Illustratively, small cells 102 can enable handover blocking utilizing a variety of techniques. In one embodiment, additional intelligence can be incorporated in a processing module to enhance the admission control criteria to decline admission to user equipment that can be classified as high speed with a high degree of reliability. In another embodiment of blocking the handover attempt, especially when speed information is unavailable or unreliable the small cell 102 could delay acceptance of handover by waiting for multiple handover request messages to be received prior to acceptance. This represents a softer form of blocking which will reduce the number of high speed handovers without affecting service to low speed users. The exact number of attempts required could be optimized or dynamically adjusted. In still another embodiment, handover blocking may include c admission control blocking only for the first "N" handover attempts. Repeated handover attempts after the first N indicate that the user equipment speed is not significant enough to move the user equipment beyond small cell coverage. As a result, the small cell 102 can allow user equipment acceptance when "N" handover attempts are received. In a further embodiment, handover blocking may relate to accepting a certain percentage of attempts or resources for handovers from a macro cell 104 and small cell 102. Call blocking may be initiated by applying specific thresholds to accept or block handovers. Other handover blocking techniques may also be implemented.

With reference to FIG. 4B, at block 450, the management component obtains performance information related to one or more adjacent macro cells 104. Illustratively, the performance information can correspond to network level statistics relating to handover performance like radio link failure rates, handover failure rates and connection re-establishment rates. At block 454, the performance information is processed to determine performance information for a target macro cell.

At decision block 456, a test is conducted to determine whether processed performance information is above a performance threshold. If the processed power information is not above the performance threshold, the probability of an error for macro handover cell coverage for the high speed user equipment is sufficient and the small cell 102 should attempt process handover requests by disabling high speed handover blocking at block 458. If the processed performance information is not above the performance threshold, the probability of an error for macro cell coverage for the high speed user equipment is not sufficient and the small cell 102 should attempt process disable or delay handover requests at the small cell by enabling high speed handover blocking at block 460. At block 462, the routine 450 terminates.

C. Management of Handbacks

As previously described, in another aspect of the present disclosure, a wireless management component can process user equipment speed information and other network information to determine whether user equipment 120 in communication with small cells 102 should initiate a handover to macro cells 104, often referred to as a handback. For example, high speed user equipment that are camped on the small cell 102 may face a dramatic drop in signal level when driving away. To prevent handover failures associated with such scenarios, if a macro cell is available, handback techniques based on pro-active RSRP neighbor cell measurements can be used to offload the user equipment to the target macro cell 104.

Figure 5:
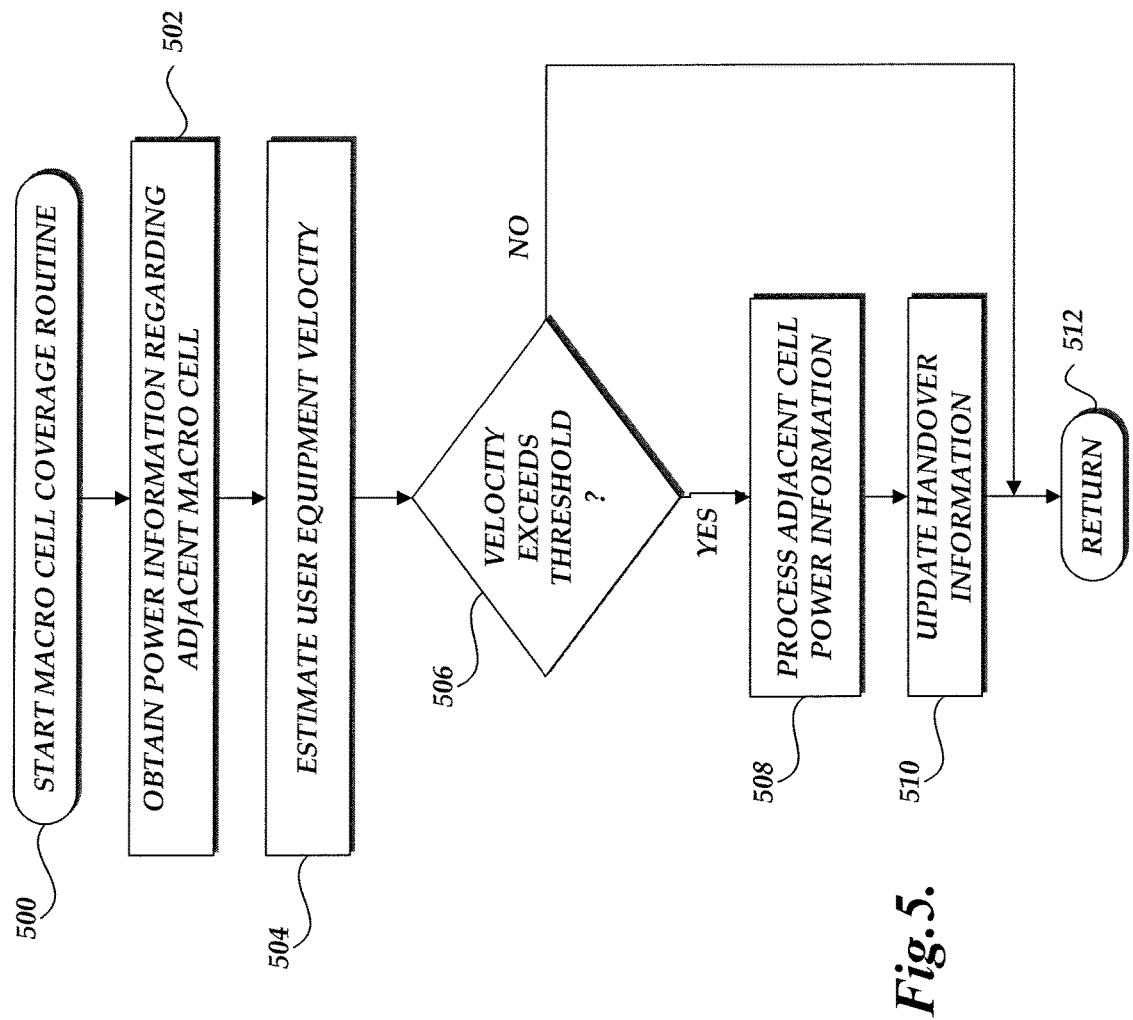
FIG. 5 is a flow diagram of a macro cell handover processing routine implemented in a wireless network.

FIG. 5 is a flow diagram of a macro cell handover processing routine 500 implemented in a wireless network 100. At block 502, the management component obtains power information regarding adjacent macro cells 104. Illustratively, the power information can correspond to RSQP reports, or the like, from user equipment 120 on a small cell 102. At block 504, the management component obtains estimates for user equipment velocity. Various techniques for estimating user equipment has been previously described.

At decision block 506, a test is to determine whether user equipment exceeds a velocity threshold. If not, the user equipment 120 is not considered to have a sufficient velocity that a handback to a macro cell 104 is required and the routine 500 terminates at block 512. Alternatively, if the user equipment exceeds a velocity threshold, the management component processes the power information for the adjacent macro cell at block 508. If the processed power information is not above a power threshold, the probability of macro cell coverage for the high speed user equipment is not sufficient and the small cell 102 should not attempt to initiate a handback to a macro cell 104. If the processed power information is above the power threshold, the probability of macro cell coverage for the high speed user equipment is sufficient and the small cell 102 should attempt to initiate a handback to a macro cell 104. At block 510, handover information is updated based on the comparison of the power information. At block 512, the routine 500 terminates.

D. Handover Triggered Interference Co-Ordination

Limiting high speed handover traffic via admission control or delayed triggers can result in inter-cell interference scenarios when a single frequency wireless network 100 is deployed. To mitigate inter-cell interference this issue, in some embodiment, high speed blocking could be turned off if uplink interference measurements indicate in increase in interference levels beyond acceptable thresholds when the rate of blocking is high. Additionally, explicit co-ordination between small cells 102 employing high speed traffic re-direction may be implemented in some embodiment. A set of "R" resource blocks could be reserved based on observed or estimated high speed handover traffic to be used by macro cells with overlapping areas of coverage. The set of RBs pre-reserved for high speed handover could be signaled via communication protocols, such as X2, to neighboring eNBs or communicated via S1 messages. Alternatively, resources could be allocated upon receipt of a handover request, and the list of allocated RBs can be communicated back to the source eNB. The list of RBs (for Uplink and Downlink) can be tailored based on the eRAB QoS Parameters. This enables the small cell 102 to achieve higher reuse than pre-reservation and at the same time mitigates high interference scenarios.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of managing wireless network components, the wireless network components including one or more small cells and one or more macro cells forming a set of cells, the method comprising:
    transmitting information for managing a handover trigger parameter, wherein the handover trigger parameter is utilized by user equipment to transmit handover requests to one or more cells in the set of cells;
    obtaining handover requests transmitted by user equipment, the handover requests transmitted based, at least in part, on the transmitted information for generating the handover request;
    determining a handover request corresponds to a handover request to a first small cell of the one or more small cells from a first macro cell of the one or more macro cells, and then processing the handover request based, at least in part, on a probability of a first macro cell coverage that satisfies a threshold, wherein:
        the first macro cell coverage is based at least in part on reference signal received power information or reference signal receiving quality information transmitted from the first macro cell to the user equipment;
    managing handovers between the small cell and the first macro cell based, at least in part, on user equipment speed information, wherein the user equipment speed information is based at least in part on an averaging coefficient associated with the one or more small cells or one or more macro cells, a distance of coverage of the user equipment in the one or more small cells or one or more macro cells, and a duration the user equipment is within the one or more small cells or one or more macro cells; and
    determining a value of the handover trigger parameter based, at least in part, on a frequency of the handover requests transmitted by the user equipment.

2. The method as recited in claim 1, wherein the handover trigger parameter corresponds to a time to trigger handover parameter.

3. The method as recited in claim 1, wherein the transmitted information utilized to manage the handover trigger parameter is utilized for adaptive tuning of the handover trigger parameter.

4. The method as recited in claim 3, wherein the adaptive tuning of the handover trigger parameter is based on a distribution of a number of handover attempts.

5. The method as recited in claim 1, wherein the transmitted information used to manage the handover trigger parameter is utilized for determining a maximum value for the handover trigger parameter.

6. The method as recited in claim 5, wherein the maximum value for the handover trigger parameter is based on a determination of whether a number of failed handover requests over a period of time is above a threshold.

7. The method as recited in claim 1, wherein the probability of the macro cell coverage comprises:
    obtaining power information for at least one adjacent cell, the power information corresponding to anticipated macro cell power levels;
    determining whether the power information is above a threshold; and
    enabling handover request blocking if the power information exceeds a threshold.

8. The method as recited in claim 1, wherein the probability of the macro cell coverage comprises:
    obtaining network based information for at least one adjacent cell, the network based information corresponding to handover failure rates;
    determining whether the network based information is above a threshold; and
    enabling handover request blocking if the network based information exceeds a threshold.

9. The method as recited in claim 1, wherein managing handovers between a small cell and a macro cell based, at least in part, on user equipment speed information includes:
    obtaining user equipment speed information;
    if user equipment speed information is above a speed threshold, determining power information; and
    if power information is above a power threshold, causing the generation of a handover request from the small cell to the macro cell.

10. A method of managing wireless network components, the wireless network components including one or more small cells and one or more macro cells, the method comprising:
    transmitting information for managing a handover trigger parameter, wherein the handover trigger parameter is utilized by user equipment to transmit handover requests to one or more cells;
    obtaining handover requests from the user equipment, the handover requests transmitted based, at least in part, on the transmitted information for generating the handover request, wherein the handover trigger parameter is different for the one or more small cells than for the one or more macro cells;
    determining a value of the handover trigger parameter based, at least in part, on a frequency of a handover success rate of the one or more small cells, coverage of the one or more small cells, and a scaling factor, wherein:
        the scaling factor is based at least in part on an user equipment speed information in at least one of the one or more small cells or in at least one of the one or more macro cells, and
        the user equipment speed information is based at least in part on an averaging coefficient associated with the one or more small cells or one or more macro cells, a distance of coverage of the user equipment in the one or more small cells or one or more macro cells, and a duration the user equipment is within the one or more small cells or one or more macro cells; and increasing the value of the handover trigger parameter, by a predetermined amount, based at least in part on a handover distribution parameter exceeding a predetermined threshold.

11. The method as recited in claim 10, wherein the handover trigger parameter corresponds to a time to trigger handover parameter.

12. The method as recited in claim 10, wherein the transmitted information utilized to manage the handover trigger parameter is utilized for adaptive tuning of the handover trigger parameter.

13. The method as recited in claim 12, wherein the adaptive tuning of the handover trigger parameter is based on a distribution of a number of handover attempts.

14. The method as recited in claim 10, wherein the transmitted information used to manage the handover trigger parameter is utilized for determining a maximum value for the handover trigger parameter.

15. The method as recited in claim 14, wherein the maximum value for the handover trigger parameter is based on a determination of whether a number of failed handover requests over a period of time is above a threshold.

16. A method of managing wireless network components, the wireless network components comprising a set of cells including one or more small cells and one or more macro cells, the method comprising:
    transmitting information for managing a handover trigger parameter, wherein the handover trigger parameter is utilized by user equipment to transmit handover requests to one or more cells in the set of cells;
    obtaining handover requests transmitted by user equipment, wherein the handover requests correspond to a handover request to one or more small cells from one or more macro cells;
    managing handovers between the one or more small cells and the one or more macro cells based, at least in part, on user equipment speed information, wherein the user equipment speed information is based at least in part on an averaging coefficient associated with the one or more small cells or one or more macro cells, a distance of coverage of the user equipment in the one or more small cells or one or more macro cells, and a duration the user equipment is within the one or more small cells or one or more macro cells;
    processing the handover requests based, at least in part, on a probability of an alternative macro cell coverage that satisfies a threshold, wherein:
        the alternative macro cell coverage is based at least in part on reference signal received power information or reference signal receiving quality information transmitted from the alternative macro cell to the user equipment;
    obtaining power information for at least one adjacent macro cell, the power information corresponding to anticipated macro cell power levels;
    determining whether the power information is above a threshold; and
    enabling handover request blocking if the power information exceeds a threshold.

17. The method as recited in claim 16, wherein the probability of the macro cell coverage comprises:
    obtaining network based information for at least one adjacent cell, the network based information corresponding to handover failure rates;
    determining whether the network based information is above a threshold; and
    enabling handover request blocking if the network based information exceeds a threshold.

18. The method as recited in claim 16, wherein processing the handover requests includes blocking one or more handover requests.

19. The method as recited in claim 16, wherein processing the handover requests includes delaying one or more handover requests.

20. The method as recited in claim 16, wherein processing the handover requests includes filtering one or more handover requests.

21. The method as recited in claim 16, wherein processing the handover requests includes selectively processing a percentage of handover requests.

22. A method of managing wireless network components, the wireless network components comprising a set of cells including one or more small cells and one or more macro cells, the method comprising:
    obtaining handover requests transmitted by user equipment, wherein the handover request corresponds to a handover request to a small cell of the one or more small cells, the handover request based on a handover trigger parameter transmitted to the user equipment and evaluated prior to transmitting a handover request;
    managing handovers between the small cell and a macro cell of the one or more macro cells based, at least in part, on user equipment speed information, wherein the user equipment speed information is based at least in part on an averaging coefficient associated with the small cell or macro cell, a distance of coverage of the user equipment in the small cell or macro cell, and a duration the user equipment is within the small cell or macro cell;
    obtaining performance information for at least one adjacent macro cell, the performance information corresponding to network level statistics comprising handover performance of the at least one adjacent macro cell, wherein the performance information comprises a probability of a coverage, associated with the at least one adjacent macro cell, that satisfies a threshold, wherein:
        an alternative macro cell coverage is based at least in part on reference signal received power information or reference signal receiving quality information transmitted from the alternative macro cell to the user equipment;
    determining whether the performance information is above a threshold; and
    enabling high speed handover request blocking if the performance information exceeds a threshold.

23. The method as recited in claim 22, wherein managing handovers between a small cell and a macro cell based, at least in part, on user equipment speed information includes:
    obtaining user equipment speed information;
    if user equipment speed information is above a speed threshold, determining power information;
    if power information is above a power threshold, causing a generation of a handover request from the small cell to the macro cell.

24. A system comprising:
    a set of cells for communication with user equipment in accordance with wireless air interface standards, wherein at least a portion of the cells are characterized as small cells and wherein at least a portion of the cells are characterized as macro cells;
    a management component for managing handovers between user equipment and the set of cells, implemented on a computing system including one or more processors and memory, the management component operable to:

transmit information for managing a handover trigger parameter, wherein the handover trigger parameter is utilized by user equipment to transmit handover requests to one or more cells in the set of cells;

obtain handover requests transmitted by user equipment, the handover requests transmitted based, at least in part, on the transmitted information for generating the handover request;

if the handover requests correspond to a handover request to a small cell, process the handover requests based, at least in part, on a probability of an alternative macro cell coverage that satisfies a threshold, wherein:

the macro cell coverage is based at least in part on reference signal received power information or reference signal receiving quality information transmitted from the alternative macro cell to the user equipment;

manage handovers between a small cell and a macro cell based, at least in part, on user equipment speed information, wherein the speed information is based at least in part on an averaging coefficient associated with the small cell or macro cell, a distance of coverage of the user equipment in the small cell or macro cell, and a duration the user equipment is within the small cell or macro cell; and determining a value of the handover trigger parameter based, at least in part, on a frequency of the handover requests transmitted by the user equipment.

25. The system as recited in claim 24, wherein the transmitted information utilized to manage the handover trigger parameter is utilized for adaptive tuning of the handover trigger parameter.

26. The system as recited in claim 24, wherein the transmitted information used to manage the handover trigger parameter is utilized for determining a maximum value for the handover trigger parameter.

27. The system as recited in claim 24, wherein the management component is operable to process the alternative macro cell coverage by being further operable to:

obtain power information for at least one adjacent cell, the power information corresponding to anticipated macro cell power levels;

determine whether the power information is above a threshold; and enable handover request blocking if the power information exceeds a threshold.

28. The system as recited in claim 24, wherein the management component is operable to process the probability of the alternative macro cell coverage by being further operable to:

obtain network based information for at least one adjacent cell, the network based information corresponding to handover failure rates;

determine whether the network based information is above a threshold; and enable handover request blocking if the network based information exceeds a threshold.

29. The system as recited in claim 24, wherein the management component is operative to manage handovers between a small cell and a macro cell based, at least in part, on user equipment speed information by being further operative to:

obtain user equipment speed information;

if user equipment speed information is above a speed threshold, determine power information; and if power information is above a power threshold, cause the generation of a handover request from the small cell to the macro cell.

* * * * *